United States Patent [19]
Shishido et al.

[11] Patent Number: 5,140,412
[45] Date of Patent: Aug. 18, 1992

[54] METHOD FOR COLOR ENCODING AND PIXELIZATION FOR IMAGE RECONSTRUCTION

[75] Inventors: Sidney L. Shishido, El Toro; Paul S. Houle, Costa Mesa, both of Calif.

[73] Assignee: UVC Corporation, Irvine, Calif.

[21] Appl. No.: 611,917

[22] Filed: Nov. 9, 1990

[51] Int. Cl.$^5$ .............................. G06K 9/00
[52] U.S. Cl. ........................................ 358/75
[58] Field of Search .............. 358/75, 78, 133; 382/56, 52, 50

[56] References Cited

U.S. PATENT DOCUMENTS

| | | | |
|---|---|---|---|
| 3,609,244 | 9/1971 | Mounts | 179/15.55 |
| 4,210,927 | 7/1980 | Yumde et al. | 358/12 |
| 4,420,771 | 12/1983 | Pirsch | 358/261 |
| 4,613,948 | 9/1986 | Gharavi | 382/52 |
| 4,654,484 | 3/1987 | Reiffel et al. | 379/53 |
| 4,843,466 | 6/1989 | Music et al. | 358/133 |
| 4,857,993 | 8/1989 | Music et al. | 358/13 |
| 4,914,508 | 4/1990 | Music et al. | 358/13 |
| 4,965,845 | 10/1990 | Chan et al. | 358/133 |

*Primary Examiner*—Stephen Brinich
*Attorney, Agent, or Firm*—Fulwider, Patton, Lee & Utecht

[57] ABSTRACT

The method for color encoding and pixelization of images utilizes signals representing groups of one or more color pixels for reconstructing an image. The method involves the steps of determining the frequency of occurrence of the color values for at least a portion of the image; determining centroid color component values representing the most frequently occurring color values; determining ranges of the selected color values encompassing the centroid color values which together encompass all of the selected color values; and encoding each color component value as a corresponding centroid color value. When the image is reconstructed from run length information, color pixels for a given run length may be based upon the color codes at the end points of the run length.

16 Claims, 1 Drawing Sheet

METHOD FOR COLOR ENCODING AND PIXELIZATION FOR IMAGE RECONSTRUCTION

BACKGROUND OF THE INVENTION

1. Field of the Invention

This invention relates generally to image processing for reconstruction of images on a display device. The invention more particularly relates to signal processing of color image data such as color video data for compression of image data to be transferred from an encoding site to a decoding site in reconstruction of color images.

2. Description of Related Art:

Ordinary telephone lines can generally carry a digital video signal at a maximum rate of about 18,000 bits per second. Digital color video coding and transmission techniques have been developed which can transmit full color still images over ordinary telephone lines, with visually acceptable quality of individual images, at data rates as low as about 11,500 bits per second. However, the amount of complexity or detail in the images to be encoded and transmitted, and the real time rate and degree of changes from one image to the next, can severely affect the capability of such techniques for encoding and transmitting color images at a visually acceptable rate without appearing as jerky motion.

Image information data compression techniques applicable to black and white video images as well as color video images have been developed which involve the reduction of redundant and non-essential information in transmitting sequences of images. One such technique involves transmitting only those parts of an image which are selected to be important or which are determined to have changed in a significant manner from a previously transmitted image. A drawback of such methods is that they can also significantly reduce the resolution of an image.

One technique useful in reduction of the time necessary to transmit a given image is known as run length encoding. This technique is described in U.S. Pat. Nos. 3,609,244 (Mounts) and 4,420,771 (Pirsch). In run length encoding, scan lines of an image are encoded as a length of a sequence of pixels having common values or ranges of values for one or more given components of the pixels, such as luminance or chrominance. One method for compressing color video data for generation of a sequence of color video images involves forming a map of color codes according to a subjective selection of the most visually significant combinations of color components in a color image. This method is described in U.S. Pat. Nos. 4,857,993 and 4,914,508 to Music et al., which are incorporated herein by reference. A technique for improving the quality of images generated with run length color information smooths color transitions by interpolating between endpoints of run lengths, as is described in U.S. Pat. No. 4,843,466 (Music et al.), which is also incorporated herein by reference.

It would be desirable to provide a method for generating a color palette directly from data from one image, for matching colors in other images in a sequence, to allow high quality color matching, and to reduce the amount of information needed for real time reconstruction of sequences of color images. It would also be desirable to provide a technique for determining a selected number of the most frequently occurring colors in an image, to allow for selection of different modes of color image reconstruction balancing the number of most frequently occurring colors in an image with the degree of compression and speed of transmission of image sequences. It would also be desirable to provide a faster, simpler method of pixelization of run length information for smoothing color transitions between the color values at the end points of run lengths, to enhance both the quality and speed of color image reconstruction.

SUMMARY OF THE INVENTION

Briefly, and in general terms, the present invention provides for a method for encoding and decoding color pixel information utilizing a plurality of signals representing either a series of individual pixel color codes or a series of combinations of a run length and a color code for reconstructing an image. In general, the method involves the steps of determining the frequency of occurrence of the color values for each color component of color code for each pixel or run length-color code combination for at least a portion of the image; determining a plurality of centroid color component values representing the most frequently occurring color values; for each centroid color component value, determining a range of the selected color values encompassing the centroid color component value such that the combined ranges for each color component encompass all of the selected color component values; and encoding each color component value encompassed in each range as the centroid color component value in the range for each pixel or run length-color code combination, for at least a portion of the image.

The three color components are preferably digitally encoded, with an initial digital word size which may be reduced before determination of the frequency distribution. The method may also include the step of substituting a visually significant color value for each color value encompassed in a range of color values, prior to the step of determining the centroid color values.

When the image is reconstructed from run length information, the method preferably further includes the step of generating color pixels for a given run length based upon the color component codes at the end points of the run length. In one embodiment, color pixels are generated for a first half of a run length with a color corresponding to the end point color code adjacent to that half, and generating color pixels for the other half of the run length with a color corresponding to the end point color code of the other half. In another embodiment, an average is determined of the color values represented by color codes at the end points of a given run length, and color pixels are generated for the middle pixels of the run length having the average color value.

These and other aspects and advantages of the invention will become apparent from the following detailed description, and the accompanying drawings, which illustrate by way of example the features of the invention.

DETAILED DESCRIPTION OF THE PREFERRED EMBODIMENT

Figure 1:
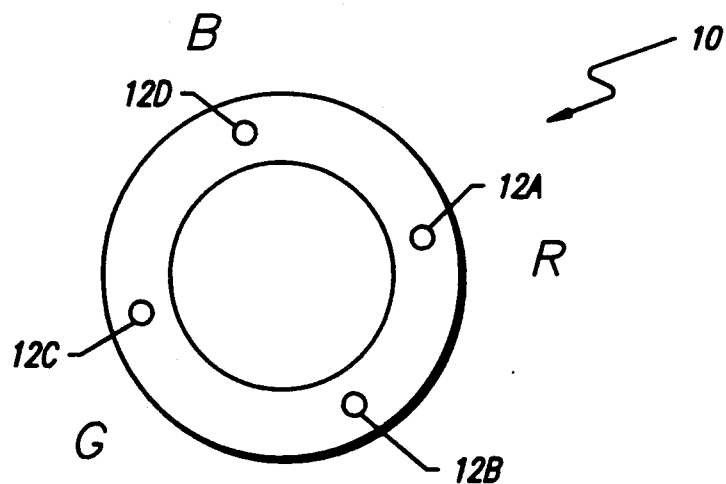
FIG. 1 is a two dimensional color space diagram illustrating the selection of centroid color components.

The invention is embodied in a method for generation of a color palette directly from data from a given image which may be used for displaying images with similar color schemes. The method utilizes electrical signals representing either individual pixels or combinations of a run length pixels and a color code for the group of pixels in the run length, for reconstructing a plurality of scan lines of color pixels. The method allows color matching for a sequence of images to be displayed, and reduction of the amount of image information needed for high quality real time image sequences. The method permits the selection of a number of the most frequently occurring colors in an image, to provide different modes of color image reconstruction, balancing the number of most frequently occurring colors in an image with the degree of data compression and speed of transmission of image sequences. The color matching technique permits color image information to be displayed at high speed on a variety of computer based display stations with high color fidelity. The technique can be used with pixel or run-length encoded data, and allows for determination of superior color matches. The method of pixelization of run length encoded color image information allows for smoothing color transitions based upon the color values at the end points of given run lengths, to provide for faster, high quality color image reconstruction.

As is illustrated in the drawings, in a preferred implementation of the invention, color pixel information for a particular image, such as a video picture frame, includes red, green and blue (RGB) components, which can for example be represented on a color wheel 10. The type of color information does not need to be RGB, since three other color component groups may also be used, such as cyan, magenta, and yellow; hue, saturation and intensity; or a combination of two distinct color components and a third component based upon the luminance or brightness of the video signal. The initial color codes representing each color component typically are digitally encoded to be eight bits in length, and it is preferable to filter the color information to exist within the domain of the display device. For example, to display images with 8 bits per color component on a VGA (6 bits per color component) device, the original 8 bit digital color component is shifted to the right by two bit positions. A frequency distribution is then preferably calculated for a particular image using the color pixel information filtered for the particular display device, to create a table of the frequency of occurrence of all of the colors used in that image.

Since colors at the extreme ranges of color gradations not only rarely appear in images captured by video cameras, but are also subjectively indistinguishable from each other, those colors within specific ranges may be encoded, or "mapped", as the colors subjectively determined to be the most significant, or most prevalent, color within those ranges. In this manner, for example, all colors close to white can be converted to the most prevalent shade of white; and this is particularly effective in the gradations toward black, allowing more colors in the middle ranges to be mapped.

Figure 2:
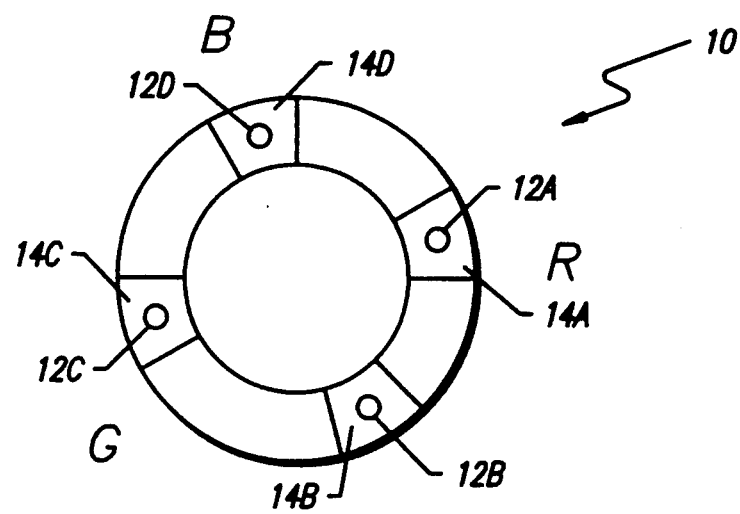
FIG. 2 is a two dimensional color space diagram illustrating the expansion of the range of color values encompassing the centroid color components.
Figure 3:
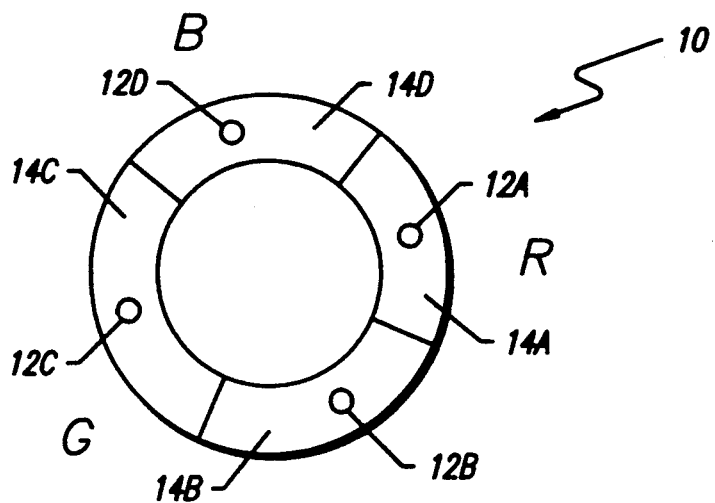
FIG. 3 is a two dimensional color space diagram illustrating the finished ranges of color values encompassing the centroid color components.

The top "n" color values in the distribution table are then preferably selected as centroids 12a, b, c, d within the color domain for each color component. Since each RGB color component is preferably represented as a 6 bit code for a VGA display device, each color component may have up to 64 gradations. Typically 256 or fewer of the top color values in the distribution table are selected as centroids for each color component. Each centroid color component value is then used as the "seed" color value within a range of color values 14a, b, c, d encompassing the centroid color. The range surrounding each centroid is expanded (FIG. 2) until each centroid range reaches an adjacent centroid range, so that all of the combined centroid ranges encompass all of the available colors, as is illustrated in the color space for HLS shown in FIG. 3. The establishment of centroids in a color space would be equally valid for illustration in an RGB color cube. At this point, the colors for subsequent images in a sequence can be mapped to the color palette based upon the centroid color values determined from the initial image. Generation of color palettes from image data can thus be used to quickly return a high quality color match in other images. Adaptive color tracking may also be performed periodically, or as scene data changes, to adjust the palette to follow the color information to be displayed. For this purpose, a color match factor may also be calculated periodically to check the correlation of a color frequency distribution of a color palette composed from a given image with subsequent images. The advantage of mapping a potential variety of 262,144 colors from the 6 bit color components to a limited number of color combinations, such as 256 colors or less, is apparent for efficient image compression. It is also possible to make the number of "n" top colors selected larger, for a better quality color match, at the expense of high speed performance of the color image reconstruction sequence; to have some lesser number of "n" top colors selected to achieve an approximate color fit, for good speed performance; or to have a subsample of an image utilized as the basis for the frequency distribution table, for further increased speed.

Although the encoding of color palettes may be performed using information from each color pixel in an image, the color codes from combinations of a run length and its corresponding color code are preferably used in both the encoding and pixelization of color image information. When run length codes are used, the end points of a run length will be typically determined based upon either an amount of change or a rate of change in color, allowing for extreme compression of color data.

In reconstruction of a color image pixel by pixel from run length data, the pixels may be generated by interpolation of the color values from the end points of the run length, which may actually be the color value of the change point of the previous run length and the color value of the change point of the current run length, as is known previously from U.S. Pat. 4,843,466, for example.

In one embodiment of the invention, a simpler, and faster technique for determining the color of a pixel being reconstructed in a run length is to generate the color represented by the color code of the previous run length-color code combination for a first half of the run length, and to generate color pixels for the next half of the run length with a color corresponding to the color code for the current run length.

In another embodiment of the invention, first and second respective color codes containing the encoded centroid color values from first and second sequential run length-color code combinations are averaged, and color pixels are generated for the first run length with the average color value.

One particular example of an approach for determining the average pixel color for a run length for pixelization and display on an 8088 microprocessor based computer, using two pixels, with RGB values each having 4 bits per color component, to calculate an intermediate color, is as follows:

```
mov     bx,ax       average the colors in AX
xor     ax,cx       and CX
and     ax,111h     leaving the result
add     bx,cx       in BX
sub     bx,ax
shr     bx,1
```

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A method for encoding color image information, in a system for displaying images composed of a plurality of groups of at least one pixel, with each said group of pixels having a color code representing three color components, each color component being digitally encoded with first, second, and third initial digital word sizes, respectively, and each said color component having a color value, comprising the steps of:

transforming each said color component to have fourth, fifth and sixth digital word sizes, respectively;

determining the frequency of occurrence of the values of each said color component for said group of pixels for at least a portion of said image;

determining a plurality of centroid color component values for each said color component representing the most frequently occurring values for said color component;

for each said centroid color component value, determining a range of said selected color values encompassing said centroid color value, such that the combined ranges for each said color component encompass all of the color values for each said color component; and encoding each color component value encompassed in each said range as the centroid color value in said range, for at least a portion of said image.

2. The method of claim 1, wherein the initial digital word size of each said color component is reduced to provide said fourth, fifth and sixth digital word sizes.

3. The method of claim 1, further including the step of substituting a visually significant color component value in at least one range of color component values for each said color code of said group of pixels, prior to said step of determining said centroid color component values.

4. The method of claim 1, wherein each said group of pixels comprises an encoded combination of a run length and a color code, and first and second sequential run length and color code combinations have first and second respective run lengths and first and second respective color codes containing said encoded centroid color component values, and further comprising the step of generating color pixels for a first half of said second run length with a color corresponding to said first color code, and generating color pixels for a second half of said second run length with a color corresponding to said second color code.

5. The method of claim 1, wherein each said group of pixels comprises an encoded combination of a run length and a color code, and wherein first and second sequential run length and color code combinations have first and second respective run lengths and first and second respective color codes containing said encoded centroid color component values, and further comprising the steps of determining an average of the color values represented by said first and second color codes, and generating color pixels for said second run length having said average color value.

6. A method for encoding colors for image reconstruction in a system for displaying an image composed of a plurality of color pixels, with each said image being represented by a plurality of combinations of run length and color codes for generating a plurality of scan lines of said color pixels, each said color code representing three digitally encoded color components each having first, second, and third initial digital work sizes, and each said color component having a plurality of possible values, comprising the steps of:

transforming each said color component to have fourth, fifth, and sixth digital word sizes, respectively;

determining the frequency of occurrence of the values of each said color component for each run length and color code combination for at least a portion of said image;

determining a plurality of centroid color component values for each said color component representing the most frequently occurring values for said color component;

for each said centroid color component value, determining a range of said selected color component values encompassing said centroid color component value, such that the combined ranges for a each said color component encompass all of the color component values for each said color component; and encoding each color component value encompassed in each said range as the centroid color component value in said range, for at least a portion of said image.

7. The method of claim 6, wherein said fourth, fifth and sixth digital word sizes of each said color component is smaller than said first, second and third digital word sizes, respectively.

8. The method of claim 7, further including the step of substituting a visually significant color component value in at least one range of color component values for each color component value encompassed in said range, for each said color code of said run length and color code combinations, prior to said step of determining said centroid color component values.

9. The method of claim 7, wherein first and second sequential run length and color code combinations have first and second respective run lengths and first and second respective color codes containing said encoded centroid color component values, and further including the step of generating color pixels for a first half of said second run length with a color corresponding to said first color code, and generating color pixels for a second half of said second run length with a color corresponding to said second color code.

10. The method of claim 7, wherein first and second sequential run length and color code combinations have first and second respective run lengths and first and second respective color codes containing said encoded centroid color component values, and further including the steps of determining an average of the color component values represented by said first and second color codes, and generating color pixels for said second run length having said average color component value.

11. A method for encoding color pixel information in a system for reconstruction of image information, said system utilizing a plurality of signals representing combinations of run length and color codes for reconstructing a plurality of scan lines of color pixels, each said color code representing three encoded color components corresponding to three separate color domains, each of said color domains having a plurality of selected color values, and each of said three color components representing a selected color value in a corresponding color domain, comprising the steps of:
 a) determining the frequency of occurrence of said color values for each said color component of each said run length and color code combination for at least a portion of said image;
 b) determining a plurality of centroid color values for each said color domain representing the most frequently occurring color values in said color domain;
 c) for each said centroid color value in each said color domain, determining a range of said selected color values encompassing said centroid color value, such that the combined ranges for each said color domain encompass all of the selected color values for each said color domain; and
 d) encoding each color value encompassed in each said range as the centroid color component in said range for each said run length and color code combination, for at least a portion of said image.

12. The method of claim 11, wherein said three color components are digitally encoded, each digitally encoded color component having an initial digital word size, and further comprising the step of transforming each said color component to have a different digital word size.

13. The method of claim 11, wherein said three digitally encoded color components are of first, second and third initial digital word sizes, respectively, and further comprising the step of transforming each said color component to have fourth, fifth, and sixth digital word sizes, respectively.

14. The method of claim 13, further including the step of substituting a visually significant color value from at least one range of color values in a color domain for each color value encompassed in said range, for each said color code of said run length and color code combinations, prior to said step of determining said centroid color values.

15. The method of claim 13, wherein first and second sequential run length and color code combinations have first and second respective run lengths and first and second respective color codes containing said encoded centroid color values, and further including the step of generating color pixels for a first half of said second run length with a color corresponding to said first color code, and generating color pixels for a second half of said second run length with a color corresponding to said second color code.

16. The method of claim 13, wherein first and second sequential run length and color code combinations have first and second respective run lengths and first and second respective color codes containing said encoded centroid color values, and further including the steps of determining an average of the color values represented by said first and second color codes, and generating color pixels for said second run length having said average color value.

* * * * *